July 13, 1943. L. P. GROBEL 2,324,297
DYNAMO-ELECTRIC MACHINE
Filed Jan. 29, 1942

Inventor:
Lloyd P. Grobel,
by Harry E. Dunham.
His Attorney.

Patented July 13, 1943

2,324,297

UNITED STATES PATENT OFFICE 2,324,297

DYNAMOELECTRIC MACHINE

Lloyd P. Grobel, Schenectady, N. Y., assignor to General Electric Company, a corporation of New York Application January 29, 1942, Serial No. 428,732

11 Claims. (Cl. 171—252)

My invention relates to improvements in dynamo-electric machines and more particularly to constructions for improving the ventilation thereof.

An object of my invention is to provide an improved dynamo-electric machine ventilating system.

Another object of my invention is to provide an improved totally enclosed dynamo-electric machine with a more efficient ventilating medium circulating system.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
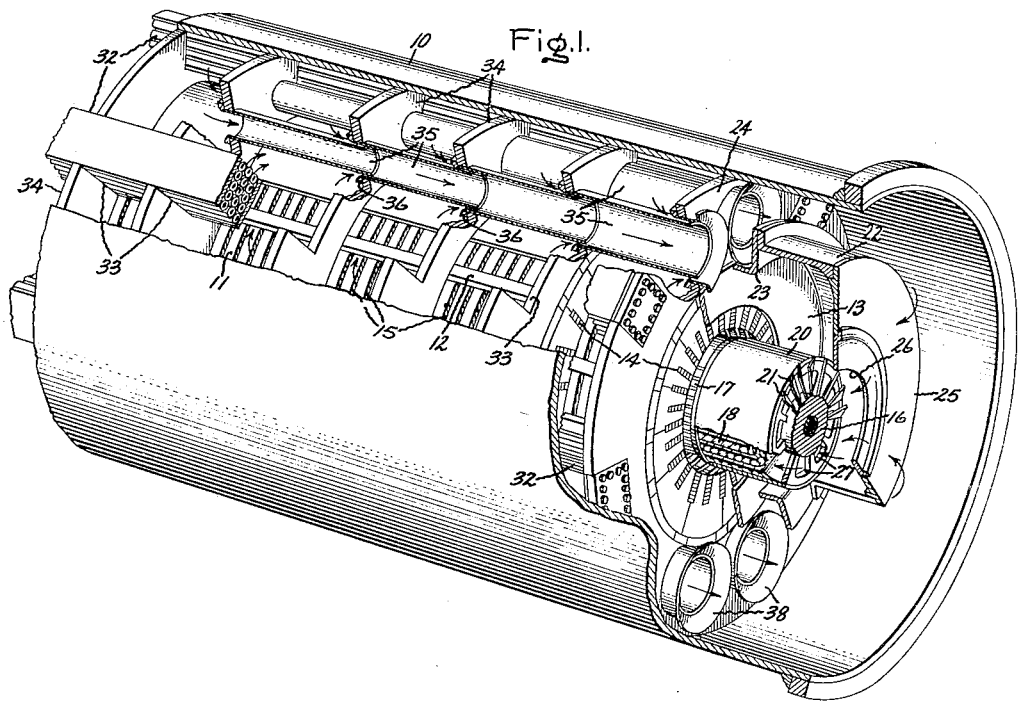
Figure 2:
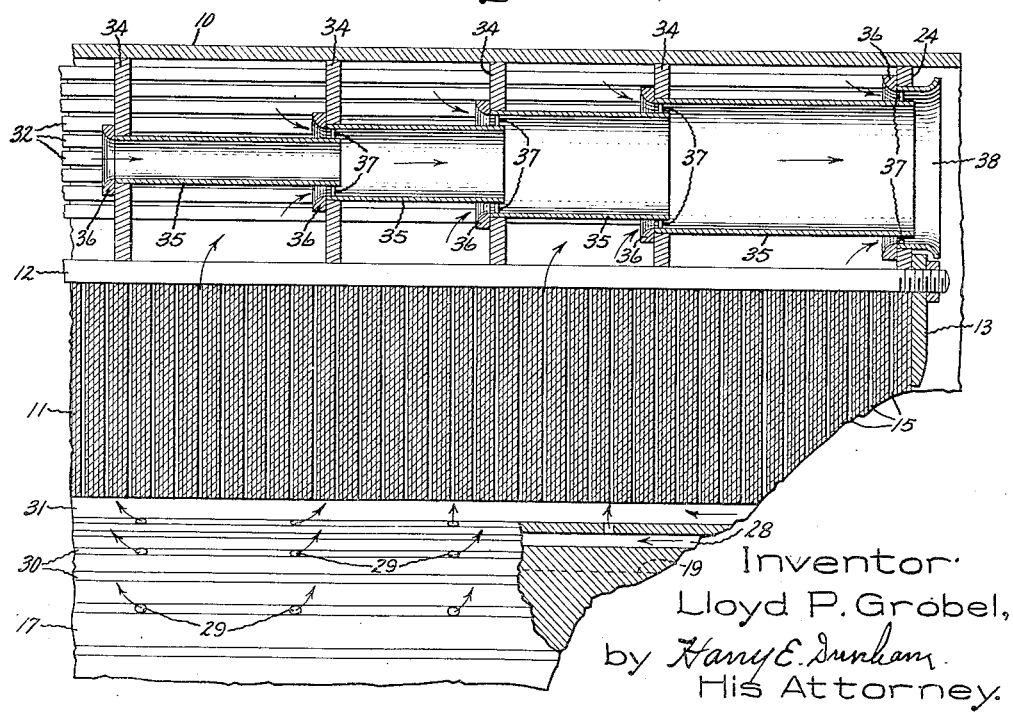

In the drawing, Fig. 1 is a partial perspective view of a dynamo-electric machine embodying my invention, partially broken away to illustrate more clearly my improved ventilating medium circulating system; and Fig. 2 is a side elevational view of a part of the machine shown in Fig. 1, partially in section.

Referring to the drawing, I have shown a dynamo-electric machine including a stationary member having an outer frame 10 in which is supported a stationary member core 11 of magnetic material. The core is formed of a plurality of laminations which are retained in assembled relationship by clamping bars or bolts 12 which secure end plates 13 about the ends of the assembled laminations. A stationary member armature winding 14 is arranged in winding slots formed in the core 11, and the entire stationary member core and winding is adapted to be cooled by a ventilating medium which is circulated about the end turns of the winding 14 and through radial ventilating passages 15 formed between groups of laminations of the core 11. The stationary member is provided with an outer end shield at each end thereof having bearings arranged to support a rotatable member shaft 16 and forming an enclosing casing with the frame wrapper plate 10. The rotatable member is adapted to provide a rotating field for exciting the stationary armature winding 14 and includes a core member 17 of magnetic material mounted on the shaft 16 and is adapted to be excited by a field exciting winding 18 arranged in extending slots 19 in the core 17. The end turns of the winding 18 are retained in position by a retaining end ring element 20 arranged about the end turns at each end of the rotatable member.

In order to circulate ventilating medium through the machine, a ventilating medium impeller having impeller blades 21 supported on the shaft 16 is mounted on the rotatable member of the machine and is adapted to be driven thereby. A stationary inner end shield 22 is mounted on a stationary ring 23 secured to a stiffening plate 24 of the stationary member frame 10 and is provided with an outer plate 25 adapted to guide ventilating medium to the intake side of the impeller. As is indicated by the arrows in the drawing, the ventilating medium passes around the inner end shield 22 through an opening 26 in the outer plate 25 to the intake side of the impeller blades 21, from which part of it is blown through passages 27 formed in the end of the retaining element 20 about the end turns of the rotatable member winding 18, through axial passages 28 in the rotatable member core above the winding 18 and out through radially extending openings 29 formed in slot wedges 30 which close the tops of the axially extending winding slots 19. A portion of the ventilating medium passes over the end turns of the stationary armature winding 14 and into an air gap 31 between the rotatable member core 17 and the stationary member core 11 and unites with the ventilating medium exhausted from the rotatable member openings 29. In the illustrated construction this ventilating medium passes through the radial passages 15 of the stationary member, outwardly through longitudinally extending surface coolers 32 mounted between the stationary member core 11 and outer frame plate 10 in supporting openings 33 in a plurality of circumferentially extending stiffening plates or walls 34. These walls 34 form a plurality of adjacent ventilating medium collecting chambers arranged about the stationary member core 11 through which the ventilating medium passes after it has been cooled for recirculation through the machine. In conventional machines the speed of flow of the ventilating gas increases as it passes through openings in the chamber wall. This causes undesirable eddy currents of gas in these chambers with a loss of energy. In order to improve the flow of ventilating gas through these chambers, I provide a plurality of intercommunicating telescopically arranged longitudinally extending exhaust tubes 35, each of which is arranged to extend between adjacent pairs of walls 34 and is provided with a flared nozzle intake 36. These tubes 35 are substantially concentrically arranged in each set with a substantially constant increase in size of intake area for each successive tube from the tube nearest the center of the machine towards the ventilating medium circulating impeller 21 in order to maintain substantially constant the speed of the ventilating medium through all successive tube passages and without any substantial pressure drop through the tubes, that is, at any substantially uniform pressure therethrough. If it is found that a larger or smaller quantity of ventilating medium is discharged into any chamber, the increase in the tube size which has its intake opening in such chamber can be correspondingly increased or decreased to assure a substantially constant speed of gas flow through all of the tubes. This assures the desired low pressure drop through this portion of the gas circulating system. The nozzle end 36 of each tube 35 is mounted directly in an opening in a wall 34 and the exhaust end of each tube 35 is substantially concentrically supported by spacing blocks 37 in the next adjacent intake tube opening. The tube 35 nearest the end shield 22 is arranged with its exhaust end mounted in the intake opening of a relatively short exhaust tube 38 having an unsupported conical or outwardly flared exhaust end of gradually increasing size providing a diffusing outlet in the end portion of the enclosing casing. A number of sets of exhaust tubes is arranged in circumferentially spaced apart relationship between the various surface coolers 32 and extends from adjacent the middle of the machine towards each end of the machine. Figs. 1 and 2 show the arrangement of half of a machine provided with my improved ventilating system and show by arrows the general flow of ventilating medium through the machine.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An enclosed dynamo-electric machine having a stationary member with a core and a rotatable member, outwardly extending ventilating passages through said stationary member core, means adjacent an end of said machine for circulating ventilating medium through said ventilating passages, means including a plurality of circumferentially extending walls for forming a plurality of adjacent ventilating medium chambers arranged about said stationary member core into which the ventilating medium passes, means arranged between adjacent pairs of said walls for providing for the passage of ventilating medium therebetween at a substantially uniform pressure therethrough.

2. A dynamo-electric machine having a stationary member with a core and a rotatable member, outwardly extending ventilating passages through said stationary member core, means adjacent an end of said machine for circulating ventilating medium through said ventilating passages, means including a plurality of circumferentially extending walls for forming a plurality of adjacent ventilating medium chambers arranged about said stationary member core into which the ventilating medium passes, means including a plurality of intercommunicating exhaust tubes each extending between adjacent pairs of said walls for providing for the passage of ventilating medium from said chambers into said tubes and through said tubes at a substantially uniform pressure through said tubes.

3. An enclosed dynamo-electric machine having a stationary member with a core and a rotatable member, outwardly extending ventilating passages through said stationary member core, means adjacent an end of said machine for circulating ventilating medium through said ventilating passages, means including a plurality of circumferentially extending walls for forming a plurality of adjacent ventilating medium chambers arranged about the stationary member core into which the ventilating medium passes, ventilating medium coolers arranged in said chambers, means arranged between adjacent pairs of said walls intermediate said coolers for providing for the passage of ventilating medium therebetween at a substantially uniform pressure therethrough.

4. A dynamo-electric machine having a stationary member with a core having ventilating passages therethrough and a rotatable member with ventilating passages, means adjacent an end of said machine for circulating ventilating medium through said ventilating passages, a plurality of walls forming adjacent ventilating medium chambers arranged about said stationary member core, means including a set of a plurality of intercommunicating longitudinally extending exhaust tubes each extending between adjacent walls and provided with nozzle intake openings for providing ventilating medium passages without substantial pressure drop through said tubes, said tubes having an increase in size for each tube towards said ventilating medium circulating means with the exhaust end of each tube supported in the intake nozzle of the next successive tube to maintain a substantially constant ventilating medium speed through all of said tube passages.

5. An enclosed dynamo-electric machine having a stationary member with a core and a rotatable member, outwardly extending ventilating passages through said stationary member core, means adjacent an end of said machine for circulating ventilating medium through said ventilating passages, means including a plurality of circumferentially extending walls for forming a plurality of adjacent ventilating medium chambers arranged about said stationary member core into which the ventilating medium passes, means including a plurality of intercommunicating longitudinally extending exhaust tubes each extending between adjacent pairs of said walls and being provided with flared nozzle intake openings for providing for the passage of ventilating medium without substantial pressure drop through said tubes, said tubes being arranged substantially concentrically relatively to each other with a substantially constant increase in size for each successive tube towards said ventilating medium circulating means.

6. An enclosed dynamo-electric machine having a stationary member with a core and a rotatable member with longitudinally extending ventilating passages and outwardly extending ventilating passages communicating with said longitudinal passages, outwardly extending ventilating passages through said stationary member core, means adjacent an end of said machine for circulating ventilating medium through said ventilating passages, a plurality of walls forming a plurality of adjacent ventilating medium chambers arranged about said stationary member core, means including a set of a plurality of intercommunicating exhaust tubes each extending between said adjacent walls, said tubes having a substantially constant increase in size for each successive tube towards said ventilating medium circulating means with the exhaust end of each tube supported substantially concentrically in the intake of the next successive tube to maintain a substantially constant ventilating medium speed through all of said successive tube passages.

7. An enclosed dynamo-electric machine having a stationary member with a core and a rotatable member, outwardly extending ventilating passages through said stationary member core, means adjacent an end of said machine for circulating ventilating medium through said ventilating passages, means including a plurality of circumferentially extending walls for forming a plurality of adjacent ventilating medium chambers arranged about said stationary member core into which the ventilating medium passes, means including a plurality of intercommunicating exhaust tubes each extending between adjacent pairs of said walls and being provided with flared nozzle intake openings for providing for the passage of ventilating medium without substantial pressure drop through said tubes, said tubes being arranged substantially concentrically relatively to each other with a substantially constant increase in size for each successive tube towards said ventilating medium circulating means with the exhaust end of each tube supported substantially concentrically in the intake nozzle of the next successive tube.

8. An enclosed dynamo-electric machine having a stationary member with a core and a rotatable member with longitudinally extending ventilating passages and outwardly extending ventilating passages communicating with said longitudinal passages, outwardly extending ventilating passages through said stationary member core, means adjacent an end of said machine for circulating ventilating medium through said ventilating passages, a plurality of walls forming a plurality of adjacent ventilating medium chambers arranged about said stationary member core, means including a set of a plurality of exhaust tubes each extending between said adjacent walls, said tubes being arranged substantially concentrically relatively to each other in said set with an increase in size for successive tubes towards said ventilating medium circulating means with the exhaust end of each tube supported in the intake nozzle of the next successive tube to maintain a substantially constant ventilating medium speed through all of said successive tube passages, the largest size tube being provided with an outwardly flared outlet.

9. An enclosed dynamo-electric machine having a stationary member with a core and a rotatable member with longitudinally extending ventilating passages and outwardly extending ventilating passages communicating with said longitudinal passages, outwardly extending ventilating passages through said stationary member core, means adjacent an end of said machine for circulating ventilating medium through said ventilating passages, means including a plurality of circumferentially extending walls for forming a plurality of adjacent ventilating medium chambers arranged about said stationary member core, means including a set of a plurality of longitudinally extending exhaust tubes each extending between said adjacent walls and provided with intake openings for providing ventilating medium passages without substantial pressure drop through said tubes, said tubes having a substantially constant increase in size for each successive tube towards said ventilating medium circulating means with the exhaust end of each tube supported substantially concentrically in the intake of the next successive tube to maintain a substantially constant ventilating medium speed through all of said tube passages.

10. An enclosed dynamo-electric machine having a stationary member with a core and a rotatable member with longitudinally extending ventilating passages and outwardly extending ventilating passages communicating with said longitudinal passages, outwardly extending ventilating passages through said stationary member core, means adjacent an end of said machine for circulating ventilating medium through said ventilating passages, a plurality of walls forming a plurality of adjacent ventilating medium passages arranged about said stationary member core, means including a set of a plurality of telescopically arranged exhaust tubes each extending between said adjacent walls and provided with flared intake openings for providing for the passage of ventilating medium without substantial pressure drop through said tubes, said tubes having a substantially constant increase in size for each successive tube towards said ventilating medium circulating means with the exhaust end of each tube supported substantially concentrically in the intake of the next successive tube to maintain a substantially constant ventilating medium speed through all of said successive tube passages.

11. An enclosed dynamo-electric machine having a stationary member with a core in an enclosing casing and a rotatable member with longitudinally extending ventilating passages and outwardly extending ventilating passages communicating with said longitudinal passages, outwardly extending ventilating passages through said stationary member core, means adjacent an end of said machine for circulating ventilating medium through said ventilating passages, means including a plurality of circumferentially extending walls for forming a plurality of adjacent ventilating medium chambers arranged about said stationary member core, means including a set of a plurality of intercommunicating telescopically arranged longitudinally extending exhaust tubes each extending between adjacent pairs of said walls and being provided with flared nozzle intake openings for providing ventilating medium passages without substantial pressure drop through said tubes, said tubes being arranged substantially concentrically relatively to each other in said set with an increase in size for each successive tube towards said ventilating medium circulating means with the exhaust end of each tube supported substantially concentrically in the intake nozzle of the next successive tube, the tube nearest said circulating means being relatively short and provided with an outwardly flared and unsupported exhaust end in the end portion of said enclosing casing.

LLOYD P. GROBEL.